United States Patent [19]

Kilmer et al.

[11] 4,047,061
[45] Sept. 6, 1977

[54] COIL PROTECTOR FOR PERMANENT MAGNET SYNCHRONOUS MOTOR

[75] Inventors: Bill G. Kilmer, Indianapolis; David F. Baugh, Jr., Greenwood, both of Ind.

[73] Assignee: P. R. Mallory & Co., Inc., Indianapolis, Ind.

[21] Appl. No.: 485,396

[22] Filed: July 3, 1974

Related U.S. Application Data

[63] Continuation of Ser. No. 342,204, March 6, 1973, abandoned.

[51] Int. Cl.² .................................... H02K 19/00
[52] U.S. Cl. ................................ 310/164; 336/90; 206/398
[58] Field of Search .................. 310/83, 162, 164; 335/278, 297; 336/82, 90, 96, 92, 198, 209; 206/52 R, 52 W, 55

[56] References Cited

U.S. PATENT DOCUMENTS 3,230,490  1/1966  Johnson ............................ 336/92
3,350,589  10/1967  Svarnias ............................ 310/164

FOREIGN PATENT DOCUMENTS 1,010,409  11/1965  United Kingdom ............. 206/52 R Primary Examiner—Harry E. Moose, Jr.
Attorney, Agent, or Firm—Hoffmann, Meyer & Coles

[57] ABSTRACT

A permanent magnet synchronous motor includes a coil protector substantially covering a coil of wire and terminations on a bobbin. The coil protector electrically insulates the coil of wire from external structure of the motor and provides physical protection to the terminations of the coil of wire.

1 Claim, 4 Drawing Figures

COIL PROTECTOR FOR PERMANENT MAGNET SYNCHRONOUS MOTOR

This is a continuation, of application Ser. No. 342,204, filed 3-6-73, now abandoned.

Generally speaking, the present invention relates to a synchronous motor construction comprising a field structure, a rotor, an electrically-energized coil, and a coil protector substantially enveloping the electrically energized coil providing both a physical protection to the wire windings and terminations and an electrically-insulated barrier between the wire and the surrounding motor structure.

Small permanent magnet synchronous motors are used in many applications including appliance timer switches such as those used in domestic washers, dryers, and ranges. Motors of this type utilize electrically-energized coils of wire wound on bobbins to provide an electromagnetic field around a permanent magnet rotor. The coils must be protected from physical damage to the coil wire and must also be electrically insulated from the surrounding motor structure. In such motors, coil protectors come in a wide variety of materials and configurations.

Most involve tapes which are difficult and expensive to assemble to coil bobbins. Some coil protectors consist of single cylindrically-shaped cardboard tubes. These have the disadvantage of falling off the coil bobbins during the motor assembly.

Accordingly, it is a feature of the present invention to provide an electric motor construction wherein a coil protector encloses the windings and terminations of a wire-wound bobbin. Another feature of the present invention is to provide an electric motor construction wherein a coil protector snaps onto a wire-wound bobbin keeping the coil protector from falling off during assembly. Another feature of the present invention is to provide a one-piece coil protector that is inexpensive to produce and to assemble to an electric motor. Another feature of the present invention is to provide a coil protector molded in one piece. A further feature of the present invention is to provide a coil protector with a hole in it matching a similar shaped flange on a wire-wound bobbin of an electric motor. Still another feature of the present invention is to provide a coil protector having a hole in it and a plurality of ribs disposed on the inside wall of the hole to facilitate snaping the coil protector onto a wire-wound bobbin. Yet another feature of the present invention is to provide a coil protector that is rigid, neat, and compact. Still another feature of the present invention is to provide a coil protector having electrical insulating properties to enable it to insulate a coil from surrounding elements of an electric motor.

These and other features of the invention will become apparent from the following description taken in conjunction with the accompanying drawings wherein.

Figure 1:
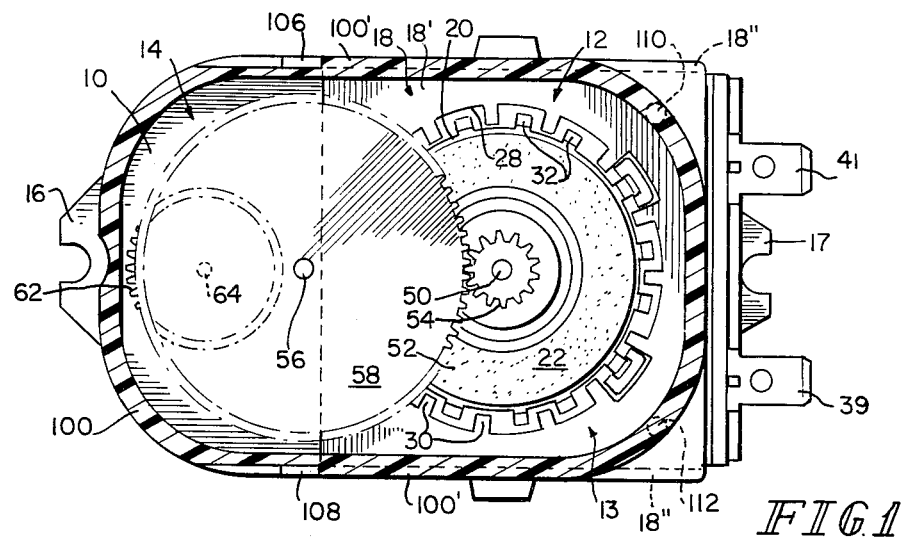
FIG. 1 is a front view of an embodiment of the invention.
Figure 2:
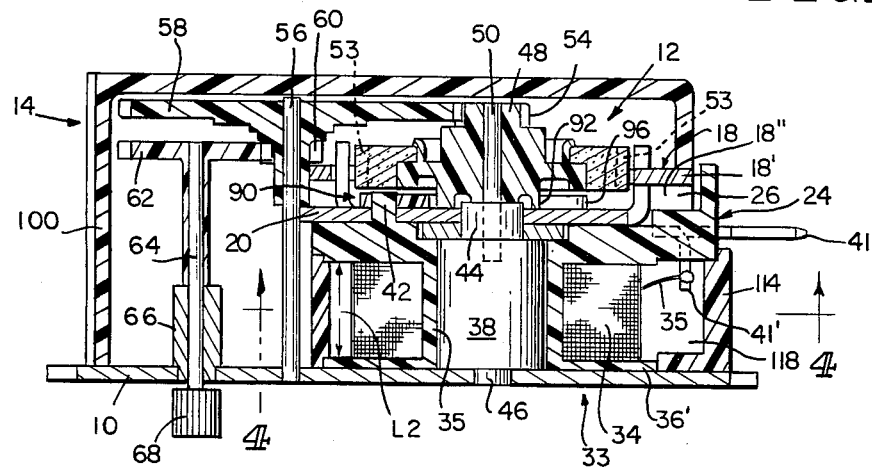
FIG. 2 is an elevation view of the same embodiment of the invention as is shown in FIG. 1.

Referring now to the drawings, mounting plate 10 provides a base upon which a motor section 12 and speed reducing section 14 may be carried. The mounting plate 10 is substantially rectangular in shape and includes a pair of ears 16 and 17 which may be used to mount the electric motor construction to a panel.

Motor section 12 is generally of the synchronous motor type and includes field structure 13, energizing winding 33, and permanent magnet rotor 22. Field structure 13 comprises an outer field plate 18 and an inner field plate 20. Energizing winding 33 comprises a wire-wound bobbin 24.

The outer field plate 18 is substantially U-shaped with a flat bottom portion 18' and a pair of opposed upstanding legs 18" engage mounting plate 10 to provide an enclosure 26 extending linearly to an area near the center of the mounting plate. There is an aperture 28 provided in the flat-bottom portion 18' into which a plurality of poles 30 extend more or less generally in a circular fashion.

The inner field plate 20 includes a substantially flat plate having integral poles 32 formed therefrom by lancing radial strips out of the plate. The poles are bent upwards to be intermeshed with the poles 30 of the outer field plate.

An iron core 38 includes a hub portion 44 which carries the inner field plate 20 and a stud 46 which serves to connect the iron core to the mounting plate 10.

Wire-wound bobbin 24 includes a coil 34 of a predetermined number of turns of wire carried on a bobbin 36. Bobbin 36 comprises a spindle 35, on which the coil 34 is wound, a resilient flange 36' extending from one end of the spindle, and a terminal-retaining flange 36" extending from the other end of the spindle. Resilient flange 36' is thin, flexible, round, and concentric with the spindle 35. Electric terminals 39 and 41 are pressed into terminal-retaining flange 36" with tabs 37' and 41' projecting from the electric terminals into the space between resilient flange 36' and terminal-retaining flange 36". Each of the two terminations 35 and 37 of coil 34 is soldered to one of tabs 39' and 41'. Bobbin 36 also includes a post 42 which serves to locate a pawl 96 of a one-way directional control for permanent magnet rotor 22 and at least one channel 37 to locate inner field plate 20. Wire-wound bobbin 24 surrounds iron core 38 which fits in a hole 33 through spindle 35.

Figures 3, 4:
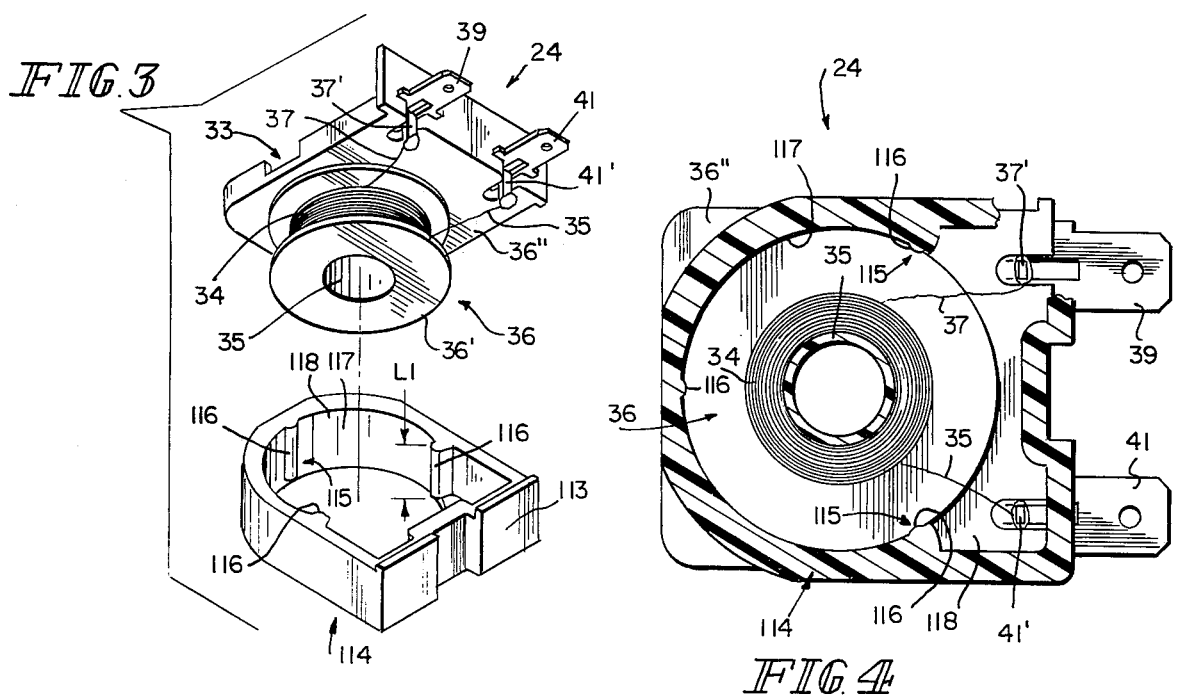
FIG. 3 is a perspective view of the coil protector and wire-wound bobbin.
FIG. 4 is a cross-section taken along line 4—4 of FIG. 2.

A coil protector 114 is sandwiched between terminal flange 36" and mounting plate 10. Referring particularly to FIG. 3, coil protector 114 comprises a substantially flat housing 113 with a hole 118 passing through it substantially of the same diameter as the resilient flange 36' of bobbin 36. Snap-on means 115 comprises a plurality of ribs 116 which are disposed on an inside wall 117 of hole 118 projecting in toward the center of hole 118 each having a vertical length L1. The vertical length L1 of ribs 116 is slightly less than a vertical distance L2 between resilient flange 36' and terminal-retaining flange 36" of bobbin 36. During assembly of the motor, ribs 116 are forced over resilient flange 36' until they snap into place between the resilient flange and terminal-retaining flange 36", thereby locking the coil protector 114 to the bobbin 36.

Permanent magnet rotor 22 includes hub 48 which is rotatably carried on a shaft 50, permanent magnet 52 and a rotor pinion 54 which is formed as part of the hub 48. Shaft 50 is rigidly held in iron core 38. The permanent magnet 52 may be fabricated of a material of a relatively high energy product partially-oriented magnetic material, such as a barium ferrite, with its outer periphery being impressed or magnetized into separate pole segments 53 of alternate sets of poles of north and south polarity. As shown, the rotor is disposed within the intermeshed poles of the inner and outer field plates and rotatable therein.

Speed reduction section 14 includes at least one shaft 56 extending from the mounting plate 10 juxtaposition the enclosure 26 provided by the outer field plate 18 and mounting plate 10. Shaft 56 is primarily supported solely by the mounting plate 10, the shaft being cantilevered to the plate. A speed reduction gear 58 is rotatably-journalled to and carried by the shaft 56. Gear 58 meshes with rotor pinion 54 carried by the hub 48 of the rotor 22. A pinion 60 carried on gear 58 engages a second gear 62. Gear 62 is fixedly held to a shaft 64 which is journaled in a bushing 66, Bushing 66 is secured to mounting plate 10. An output pinion 68 is carried on shaft 64. One-way directional means 90 includes a cam 92 carried by hub 48, and pawl 96 pivotly carried by post 42.

A shroud 100 covers substantially the entire motor and speed reduction sections to aid in keeping dust and other deleterious matter from the structures. In addition the shroud aids in keeping the gears and other mechanism within a confined area. The side walls 100' of the shroud are flexible and include ribs (not shown) such that the walls may be flexed to engage the ribs with tabs 106 and 108 extending from the outer field plate thus securing the shroud in place. The shroud also includes posts 110 and 112 which engage apertures in outer field plate 18 (not shown) to guide and align the shroud.

In operation, when an AC current is applied to the winding 24, the permanent rotor 22 will begin to rotate due to the magnetic flux generated between the rotor poles and the field poles with good starting characteristics being achieved by the asymmetrical arrangement of the field poles. The one-way directional means, will assure operable rotation of the permanent magnet rotor in the right direction. The speed reduction means will change the rotor output to a desired rotational speed to be applied to motor output pinion 84.

What is claimed is:

1. An electric motor construction comprising:
   a. a field structure;
   b. an energizing winding comprising a wire wound bobbin comprising a spindle, a coil of wire surrounding the spindle, said spindle carrying in substantially spaced relation a resilient flange and a terminal-retaining flange, ends of said wire being connected to two terminals in said terminal retaining flange;
   c. a permanent magnet rotor; and
   d. a coil protector comprising:
      1. a substantailly-flat housing having a hole passing through it substantially the same size and shape as said resilient flange of said coil bobbin and of sufficient depth to envelop the outer periphery of said coil, and
      2. a plurality of ribs projecting from an inside wall of said hole in toward the center, each having a length in a direction substantially parallel to the axis of said spindle about equal to the inside length of said spindle from said resilient flange to said terminal-retaining flange, whereby said coil protector is pressed down against said resilient flange, to force said projections over said resilient flange and snap them into place between said resilient flange and said terminal-retaining flange thereby entraping said coil protector to said wire-wound bobbin.

* * * * *